VOLUME CHANGER EMPLOYING A MAGNETIC RESPONSIVE RESISTOR AND PROVIDING A DIRECT OR INVERSE RELATION OF OUTPUT TO INPUT
Original Filed Dec. 15, 1960
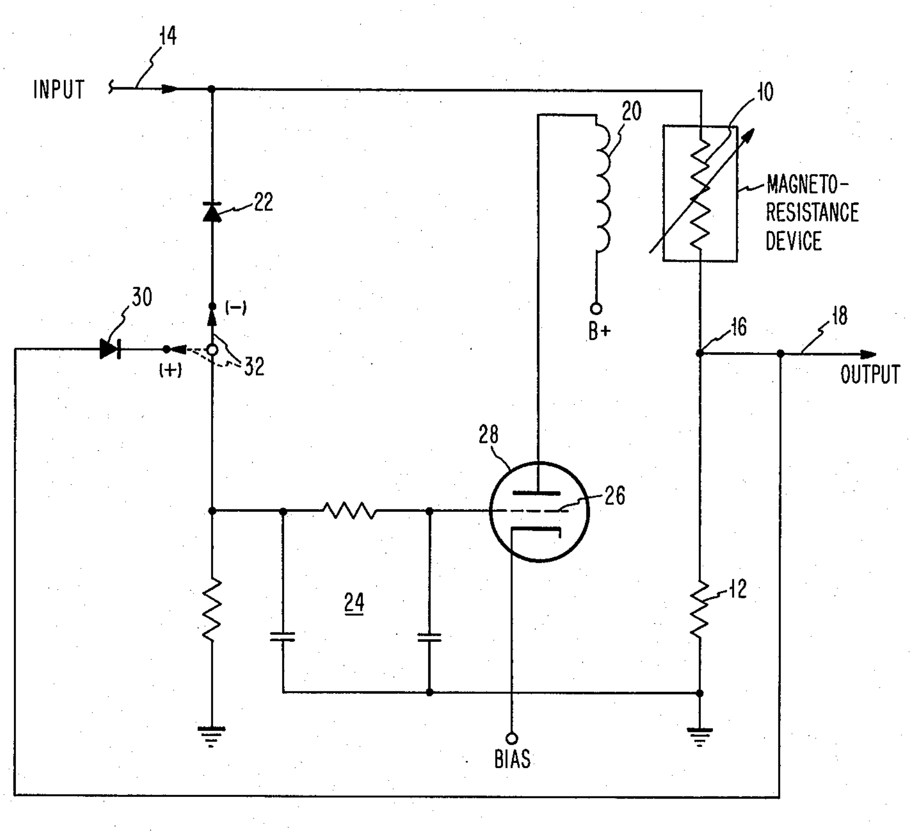
INVENTOR.
WILLIAM ROSS AIKEN
BY
Kurt Hanchen United States Patent Office 3,215,928

Patented Nov. 2, 1965

3,215,928

VOLUME CHANGER EMPLOYING A MAGNETIC RESPONSIVE RESISTOR AND PROVIDING A DIRECT OR INVERSE RELATION OF OUTPUT TO INPUT

William Ross Aiken, 10410 Magdalena Ave., Los Altos Hills, Calif.

Original application Dec. 15, 1960, Ser. No. 76,014. Divided and this application Feb. 26, 1962, Ser. No. 175,612

5 Claims. (Cl. 323—94)

This is a division of my U.S. patent application Serial No. 76,014, filed December 15, 1960, and now abandoned.

The present invention relates to circuit arrangements which operate to change the volume of a desired signal.

The problem of controlling the gain of electronic amplifiers in the face of variations in the strength of the incoming signal exists in the field of audio and radio broadcasting, and more recently also in the television field. Thus, in radio transmission a standard level of signal strength is obviously desirable from the viewpoint of optimum utilization of the transmitting facilities, and proper control of the occasional excessive modulation peaks permits a substantial increase in the signal power; and in audio reproduction appropriate volume control enables the listener to restore the full contrast present in the original signal, for instance in vocal and instrumental music, which is generally reduced by compression at the place of origin.

Most of the methods that have been proposed in the past for controlling the gain of a signal suffer from one or more serious defects. One such defect is that the control voltage may appear in the output of the amplifier and, moreover, may be many times larger than the desired signal itself. Some attempts have been made to reduce this undesirable effect by placing a limitation on the speed of response of the control operation so that the frequency of the control voltage lies well below the frequency of the signal voltage and may thus be filtered out with relative ease. Alternatively, push-pull circuits or balanced modulator circuits have been used to cancel out the control voltage in the amplifier output. However, such remedies may restrict the control circuits to relatively low speeds of response. Moreover, it is usually necessary to operate amplifiers of this type at very low volume levels to maintain distortion within tolerable limits. Thus, previously proposed gain control systems have been slow in operation, restricted in band width, delicate in balance, and subject to considerable distortion.

It is an object of the invention to provide a volume changer that suffers from none of these difficulties.

More specifically it is an object of the invention to provide a rapidly responsive automatic volume changer arrangement which does not distort the signal as it changes its volume.

Still another object of the invention is to provide an automatic volume changer arrangement which does not introduce control voltages into the controlled signal so that only the desired signal appears in the output of the volume changer arrangement.

These and other objects of my invention will be apparent from the following description of the accompanying drawing which shows a circuit diagram of a preferred embodiment of an automatic volume changer arrangement embodying my invention.

The arrangement illustrated in the drawing comprises a pair of resistors 10 and 12 that are connected in series between the input means 14 of the arrangement and ground, and a portion of the signal voltage developed across these resistors is taken off at a point 16 between said resistors and appears in the output line 18. The size of the signal voltage appearing in the output line depends upon the relative value of the two series-connected resistors and will be large if resistor 12 is large as compared with resistor 10 or small if the resistor 12 is small as compared with resistor 10. Hence, by making one or the other of said resistors variable, it is possible to increase or decrease the relative size of the signal output in line 18 at will. In the exemplary embodiment of the invention illustrated in the drawing, the upper resistor 10 is made variable and in accordance with my invention it is formed by a magneto-resistance device. Such devices are made of the same materials as polycrystalline Hall generators and are of low resistance in the absence of a magnetic field, but their resistance may be increased by factors ranging from 25 to 50 when placed into a magnetic field. In accordance with the invention, therefore, I arrange adjacent the magneto-resistance device 10 a magnetizing coil 20, and the magnetic field generated by said coil and hence the resistance value of the device 10 is controlled by the strength of the signal that passes through the arrangement. If the arrangement is to operate as a volume expander, the energization of coil 20 may be controlled by a negative voltage which is derived from the signal at the input end of the arrangement in such a manner that energization of the coil 20 is reduced as the volume level of the incoming signal increases and is intensified as the volume level of said signal decreases so that the value of magneto-resistance device 10 decreases with increasing volume level and increases with decreasing volume level. This causes the voltage appearing in the output line 18 to increase as the volume level of the signal increases and to decrease as the volume level of the signal decreases.

Having again reference to the drawing, a part of the incoming signal voltage is rectified at 22 and the negative component thereof is applied through a suitable filter network collectively identified by the reference numeral 24 to the control grid 26 of a tube 28 in whose anode circuit the magnetizing coil 20 is located. Hence, as the negative control voltage applied to the grid of the tube 28 increases, less current flows in the anode circuit of said tube and the magnetic field generated by the coil 20, therefore, decreases. This causes the resistor 10 to decrease in value and the voltage in line 18 to increase in size; and vice versa, when the volume level of the incoming signal decreases, the negative bias applied to the control grid of the tube 28 decreases and causes more current to flow in the anode circuit thereof. As a result thereof, the magnetic field generated by coil 20 increases in intensity which causes the value of the variable resistor 10 to increase and reduce the voltage of the signal appearing in output line 18.

To operate the described arrangement as a volume compressor a part of the signal voltage appearing in the output line 18 may be rectified at 30, and the positive component thereof be supplied through the filter network 24 to the control grid 26 of the tube 28 causing said grid to become more positive as the volume level of the output signal increases. This increases the current flow in the anode circuit of the tube 28 and as a result thereof the magnetic field generated by coil 20 increases in intensity, which causes the resistance of the magnetic resistance device 10 to increase. Thus, with increasing volume level of the output signal, the arrangement operates to reduce the volume level of the output signal; and vice versa, as the volume level of the signal appearing in the output line 18 decreases, less positive bias is applied to the grid of the tube 28, less current flows through the coil 20 and the resistance of device 10 decreases causing a greater portion of the voltage to appear in output line 18.

In the particular embodiment of the invention illustrated in the drawing, the volume changer arrangement may readily be set to operate as an expander or compressor by manipulation of a suitable switch 32 which supplies the grid of the tube 28 with a negative control voltage derived from the input side of the arrangement when in the position shown in full lines, and with a positive control voltage derived from the output line of the arrangement when in the position shown in broken lines. At the same time it is, of course, necessary to change appropriately the initial bias applied to the control grid of the tube 28. It will be understood by those skilled in the art that a volume expander arrangement may also be constructed to derive its control voltage from the output side of the volume changer, and vice versa, a volume compressor arrangement may also be constructed to derive its control voltage from the input side of the volume changer. Furthermore, an external source of control voltage may be employed to exercise remote control over the arrangement of the invention and/or control the arrangement according to a predetermined program.

The automatic volume control arrangement of my invention is of simple construction, yet operates fast and dependably. Since the magneto-resistance device does not by itself produce a voltage, no control voltages are introduced into the signal, that might appear in the output line of the volume changer and distort the desired signal or produce background noises.

It is within the scope of my invention to modify the arrangement illustrated in the drawing by using a magnetic-resistance device for resistor 12 and employing an ordinary resistor in place of the device 10. In such an arrangement it is necessary, however, to control the flow of current through the magnetizing coil 20 with a positive voltage if the arrangement is to operate as an expander, and to control the flow of current through the coil 20 with a negative voltage if the arrangement is to operate as a compressor.

While I have explained by invention with the aid of a preferred embodiment thereof, it will be understood that the invention is not limited to the specific circuit arrangement shown and described by way of example, which may be departed from without departing from the scope and spirit of the invention.

I claim:

1. A volume changer arrangement comprising alternating signal input means, a pair of resistors connected in series between said signal input means and ground, at least one of said resistors being a magneto-resistance device having a resistance value that varies in response to magnetic fields, means for establishing a magnetic field adjacent said magneto-resistance device, and means for controlling the intensity of the magnetic field established by said field-establishing means with a voltage derived from the input signal passing through the volume changer arrangement.

2. A volume changer arrangement comprising signal input means, a resistor variable in response to magnetic fields and a fixed resistor connected in series between said input means and ground, signal output means connected to a point intermediately of said resistors, a magnetizing coil arranged adjacent said variable resistor, means for energizing said magnetizing coil, and means for controlling the intensity of the magnetic field established by said magnetizing coil with a voltage derived at said input means from the signal passed through said volume changer.

3. A volume changer arrangement comprising signal input means, a resistor variable in response to magnetic fields and a fixed resistor connected in series between said signal input means and ground, signal output means connected to a point intermediately of said resistors, means for establishing a magnetic field arranged adjacent said variable resistor, and means for controlling the degree of energization of said field-establishing means with a voltage derived at said signal output means from the signal passed through the volume changer arrangement.

4. A volume changer arrangement comprising alternating signal input means, a resistor variable in response to magnetic fields and a fixed resistor connected in series between said signal input means and ground, signal output means connected to a point intermediately of said resistors, means for establishing a magnetic field arranged adjacent said variable resistor, and means for controlling the degree of energization of said field-establishing means in inverse relation to the volume strength of the signal passing through said arrangement with a voltage derived from the input signal passing through said arrangement.

5. A volume changer arrangement comprising signal input means, a resistor variable in response to magnetic fields and a fixed resistor connected in series between said signal input means and ground, signal output means connected to a point intermediately of said resistors, means for establishing a magnetic field arranged adjacent said variable resistor, and means for controlling the degree of energization of said field-establishing means in direct relation to the volume strength of the signal passing through said arrangement with a voltage derived from the signal passing through said arrangement.

References Cited by the Examiner

UNITED STATES PATENTS

| | | | |
|---|---|---|---|
| 2,549,775 | 4/51 | Charchian | 338—32 |
| 2,752,434 | 6/56 | Dunlap | 338—32 |
| 2,979,668 | 4/61 | Dunlap | 330—62 |
| 3,082,381 | 3/63 | Morrill et al. | 330—59 |
| 3,086,126 | 4/63 | Dunlap | 307—88.5 |

FOREIGN PATENTS

| | | |
|---|---|---|
| 1,181,706 | 6/59 | France. |
| 848,369 | 9/60 | Great Britain. |

LLOYD McCOLLUM, *Primary Examiner.*